(12) United States Patent
Fukudome (10) Patent No.: US 9,688,096 B2
(45) Date of Patent: Jun. 27, 2017

(54) DISK WHEEL

(71) Applicant: TOYOTA JIDOSHA KABUSHIKI KAISHA, Toyota-shi, Aichi (JP)

(72) Inventor: Hideki Fukudome, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 36 days.

(21) Appl. No.: 14/777,635

(22) PCT Filed: Feb. 12, 2014

(86) PCT No.: PCT/JP2014/053148
§ 371 (c)(1),
(2) Date: Sep. 16, 2015

(87) PCT Pub. No.: WO2014/162777
PCT Pub. Date: Oct. 9, 2014

(65) Prior Publication Data
US 2016/0288563 A1   Oct. 6, 2016

(30) Foreign Application Priority Data

Apr. 4, 2013   (JP) ................................. 2013-078206

(51) Int. Cl.
*B60B 3/12*   (2006.01)
*B60B 3/08*   (2006.01)
(Continued)

(52) U.S. Cl.
CPC ............... *B60B 3/12* (2013.01); *B60B 3/008* (2013.01); *B60B 3/08* (2013.01); *B60B 3/10* (2013.01);
(Continued)

(58) Field of Classification Search
CPC .. B60B 3/08; B60B 3/085; B60B 3/12; B60B 5/02
(Continued)

(56) References Cited

U.S. PATENT DOCUMENTS 3,826,538 A * 7/1974 Lipper .................... B60B 25/22
301/64.306
3,909,065 A * 9/1975 Main ......................... B60B 3/08
264/46.5
(Continued)

FOREIGN PATENT DOCUMENTS

JP   S60-82402 A    5/1985
JP   S60-151702 U   10/1985
(Continued)

OTHER PUBLICATIONS

Apr. 15, 2014 Search Report issued in International Patent Application No. PCT/JP2014/053148.

*Primary Examiner* — Jason Bellinger
(74) *Attorney, Agent, or Firm* — Oliff PLC (57) ABSTRACT

In a disk wheel, a metal insert member is embedded in a resinous bolt-fastening part having a bolt hole. The insert member includes: an opposing surface which is opposed to a resin member of the bolt-fastening part; a bonding area a bonded to the resin member within the opposing surface; and a non-bonding area within the opposing surface. The non-bonding area is not bonded to the resin member, but extends from the bonding area so as to receive a load generated when the resin member deforms. It is thereby possible to provide a technique to effectively suppress the influence of residual stress remained after molding of the resin member of the bolt-fastening part, and to ensure the strength required for the bolt-fastening part.

6 Claims, 4 Drawing Sheets

(51) Int. Cl.
  *B60B 3/10*     (2006.01)
  *B60B 5/02*     (2006.01)
  *B60B 3/00*     (2006.01)
  *B60B 27/06*    (2006.01)

(52) U.S. Cl.
  CPC .............. *B60B 5/02* (2013.01); *B60B 27/065* (2013.01); *B60B 2360/10* (2013.01); *B60B 2360/32* (2013.01); *B60B 2360/348* (2013.01); *B60B 2900/111* (2013.01); *B60B 2900/311* (2013.01)

(58) Field of Classification Search
  USPC ............ 301/35.626, 63.107, 63.108, 64.306, 301/64.703
  See application file for complete search history.

(56) References Cited

U.S. PATENT DOCUMENTS

| | | | | |
|---|---|---|---|---|
| 4,114,953 | A | * | 9/1978 | Baumgartner ............ B60B 1/06 |
| | | | | 301/64.306 |
| 4,223,952 | A | * | 9/1980 | Weld ....................... B60B 25/22 |
| | | | | 29/894.322 |
| 4,640,330 | A | * | 2/1987 | Frassica .................. B60B 3/085 |
| | | | | 152/404 |
| 6,000,762 | A | * | 12/1999 | Chang ....................... B60B 3/08 |
| | | | | 152/DIG. 10 |
| 6,340,210 | B1 | | 1/2002 | Handa et al. |

FOREIGN PATENT DOCUMENTS

| | | |
|---|---|---|
| JP | S64-55102 U | 4/1989 |
| JP | H02-128958 A | 5/1990 |
| JP | 2000-313201 A | 11/2000 |
| JP | 2002-293104 A | 10/2002 |
| JP | 2008-268675 A | 11/2008 |
| JP | 2009-298328 A | 12/2009 |
| JP | 2012-035568 A | 2/2012 |

* cited by examiner

DISK WHEEL

TECHNICAL FIELD

The present invention relates to a disk wheel to which a tire is attached.

BACKGROUND ART

A disk wheel made of resin material such as fiber-reinforced plastic is disclosed in Japanese Patent Laid-Open Applications (kokai) No. 2012-35568, No. 2002-293104 and No. Showa 60-82402. While a weight reduction of this disk wheel is realized by using the resin material, strength of a resinous bolt-fastening part which has bolt holes of the wheel disk is secured by embedding a metal insert member in the bolt-fastening part.

SUMMARY OF INVENTION

Typically, the resin member and the insert member are bonded to each other, when molding the disk wheel. In this case, an excessive residual stress (a thermal distortion stress) occurs in the resin member after molding of the disk wheel due to the difference in a thermal expansion coefficient between the resin member and the insert member. Therefore, in order to reduce the influence of the residual stress, it is necessary to downsize the area in which the resin member and the insert member are bonded to each other. On the other hand, downsizing the area in which the resin member and the insert member are bonded to each other causes a problem that it is difficult to ensure the strength of the bolt-fastening part, since the bolt-fastening part is easily deformed due to an excessive load when a vehicle is running. In particular, for a wheel having a large axle hub such as a wheel for mounting an in-wheel motor, the diameter of the bolt-fastening part of the disk wheel becomes large, so that the above problem becomes more salient.

The present invention has been made in view of the above, and one of objects of the present invention is to provide an effective technique to suppress the influence of the residual stress remained after molding of the resin member of the bolt-fastening part, and to ensure the strength required for the bolt-fastening part, in a disk wheel in which a metal insert member is embedded in a resinous bolt-fastening part having (a) bolt hole(s).

To achieve the above object, in a disk wheel according to the present invention, a metal insert member is embedded in a resinous bolt-fastening part having a bolt hole, and the insert member includes an opposing surface, a bonding area, and a non-bonding area. The opposing surface is opposed to a resin member of the bolt-fastening part. The bonding area is bonded to the resin member of the bolt-fastening part. The non-bonding area extends from the bonding area without being bonded to the resin member of the bolt-fastening part so as to serve a function to receive a load when the resin member is deformed. In this case, since a whole opposing face of the insert member is not bonded to the resin member of the bolt-fastening part, the influence of the residual stress in the resin member after a molding of the disk wheel is suppressed. On the other hand, since the non-bonding area can support the resin member when it is deformed, the supporting structure of the non-bonding area can compensate for the reduction in strength caused by the reduction in the size of the bonding area. Consequently, the required strength of the bolt-fastening part is ensured if the size of the bonding area between the resin member of the bolt-fastening part and the insert member is reduced.

In another aspect of the disk wheel according to the present invention, it is preferable that the non-bonding area of the insert member be opposed to the resin member of the bolt-fastening part across a predetermined gap, and be in contact with the resin member when the resin member is deformed. Accordingly, the timing of supporting the resin member of the bolt-fastening part can be adjusted in accordance with an amount of the deformation of the resin member, and thus, a structure can be realized, the structure permitting the deformation of the resin member and being able to receive the load of the resin member only upon required.

In another aspect of the disk wheel according to the present invention, it is preferable that a plurality of the bolt holes are annularly arranged in a circumferential direction of the disk wheel, and the insert member is allocated to each of the resin members of the bolt-fastening part corresponding to each bolt hole. According to this aspect, as compared with a case in which a single insert member is allocated to a resin member of a single bolt-fastening part which is common for a plurality of the bolt holes, the size of the bonding area between the resin member and the insert member can be reduced, and the influence of the residual stress in the resin member after the molding of the disk wheel can be suppressed.

It is preferable that another aspect of the disk wheel according to the present invention comprise a cylindrical rim, a discoidal disk which is jointed to the rim, and a hub part which has the bolt holes and is opposed to an axle hub of the disk, wherein fastening bolts provided to the axle hub are inserted through the bolt holes. According to the aspect, with respect to the bolt-fastening part provided in the hub part within the disk of the disk wheel, the influence of the residual stress in the resin member after the molding of the disk wheel can be suppressed, and the required strength can be secured.

In another aspect of the disk wheel according to the present invention, it is preferable that the disk comprise a plurality of spoke parts which extend radially from the hub part. It is preferable that each of the insert members (also referred to as a "divided insert member") allocated to each of the bolt holes be arranged from a hollow part of the hub part to a hollow part of the respective spoke part, and comprise a through hole formed through in an arranged area of the hub part so as to form a part of the bolt hole. In this case, the fastening bolt provided to the axle hub is insert into the through hole of the each of the insert members (the divided insert members) when the fastening bolt is insert into the respective bolt hole. Consequently, each of the insert members can be fastened to the bolt-fastening part using fastening between the fastening bolt and nut.

It is preferable that another aspect of the disk wheel according to the present invention comprise a cylindrical rim, a discoidal disk which is formed separately from the rim, and a peripheral part having the bolt holes within the disk, and a fastening bolt for fastening the rim and the disk to each other be inserted through each of the bolt holes. According to the aspect, in particular with respect to the bolt-fastening part provided in the peripheral part within the disk of the disk wheel, the influence of the residual stress in the resin member after molding of the disk wheel can be suppressed, and the required strength can be secured.

As described above, according to the present invention, in the disk wheel in which the metal insert members are embedded in the resinous bolt-fastening parts having the bolt holes, the influence of the residual stress after molding the resin member of the bolt-fastening part can be suppressed, and the required strength of the bolt-fastening part can be secured.

DESCRIPTION OF EMBODIMENTS

Hereinafter, embodiments of the present invention will be described with reference to the drawings.

Figure 1:
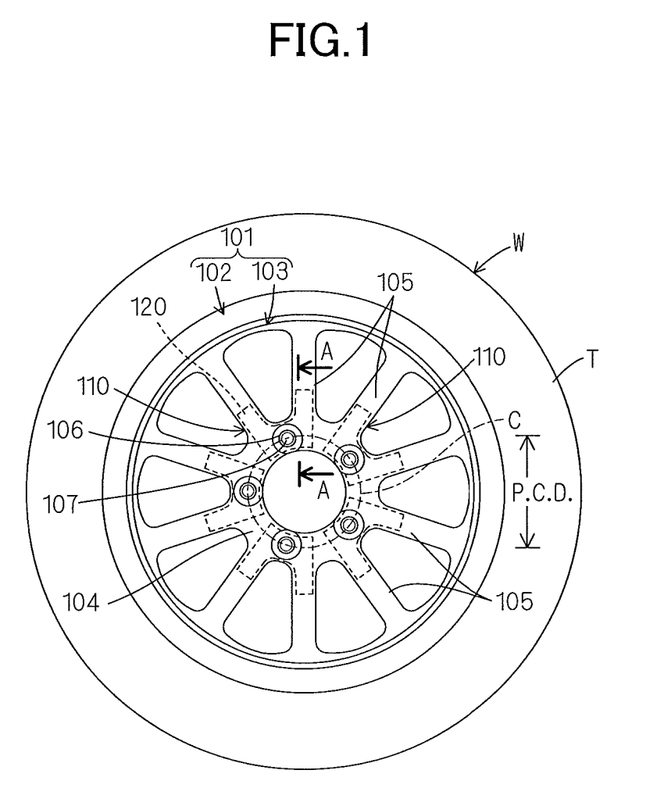
FIG. 1 is a plain view of a disk wheel 101 according to an embodiment of the present invention.

FIG. 1 shows a disk wheel 101 according to the present invention. A tire T is attached to the disk wheel 101 so that a wheel W to be attached to a vehicle is composed. The disk wheel 101 comprises a cylindrical rim 102 for holding the tire T, and a discoidal disk 103 which is jointed with the rim 102. That is, this disk wheel 101 has a so-called "one-piece structure". The disk 103 further comprises a hub part 104 attached to an axle hub (not shown), spoke parts 105 which extend radially from the hub part 104. The disk 103 may be a type of the disk which does not comprise the spoke parts 105. A plurality of bolt-fastening parts 110 arranged coaxially and annularly in the circumferential direction of the disk 103 (the circumferential direction of the disk wheel) are provided to the hub part 104. A bolt hole 106 is formed in each of the bolt-fastening parts 110. Each of a plurality of fastening bolts 107 provided to the axle hub is inserted through the bolt hole 106. The fastening bolt 107 is fastened by a nut in a state in which the fastening bolt 107 are inserted through the bolt hole 106, at each of the bolt-fastening parts 110. The bolt hole 106 and the bolt-fastening part 110 correspond to a "bolt hole" and a "bolt-fastening part" of the present invention, respectively. It should be noted that, in a wheel W driven by a driving force generated by the in-wheel motor, a diameter of the bolt-fastening part 110 of the disk wheel 101 becomes large due to a growth in size of the axle hub, and thus, a P.C.D (a diameter of a pitch circle C shown in FIG. 1) of the hub part 104 is appropriately set at a length ranging from 150 to 250 [mm].

The disk wheel 101 is mainly composed of carbon fiber reinforced plastic (CFRP) as resin material. Each of metal insert members (also referred to as a "divided insert member") 120 is allocated to and embedded in each of a plurality of the bolt-fastening parts 110 of the disk 103. This insert member 120 corresponds to an "insert member" of the present invention. Each of the insert members 120 is arranged from an inside (hollow part) of the hub part 104 having the bolt holes 106 to an inside (hollow part) of the spoke part 105. The insert member 120 is typically composed of a light alloy such as an aluminum alloy or a magnesium alloy. Thus, the insert member 120 allows the disk wheel 101 to be made of the resin material so as to effectively reduce the weight of the disk wheel 101, and effectively enhance the strength of the bolt-fastening part 110.

The "carbon fiber reinforced plastic" is a material obtained by molding carbon fiber with resin. In this case, typical examples of the "carbon fiber" are a PAN-based carbon fiber obtained by carbonizing a PAN precursor (polyacrylonitrile fiber), a pitch-based carbon fiber obtained by carbonizing a pitch precursor (a pitch fiber made of coal tar or petroleum heavies as an ingredient), and the like. In a case where the disk wheel 101 is formed using the carbon fiber composite member, an autoclave molding can typically be used. Specifically, the insert members 120 are sandwiched between two of metal molds, to which a resin layer composed of a prepreg is applied respectively (prepreg being a sheet-shaped intermediate material for forming which is in a semi-cured state wherein thermosetting resin is impregnated into a carbon fiber); encapsulated air, volatiles, or the like is removed using vacuum removal in an autoclave; and then resin layers are cured by heating and pressurizing. In this case, each of the resin layers and the insert members 120 are bonded to each other by interposing a predetermined adhesive therebetween, or are directly bonded to each other by the applied heat during molding without using an adhesive.

Figure 2:
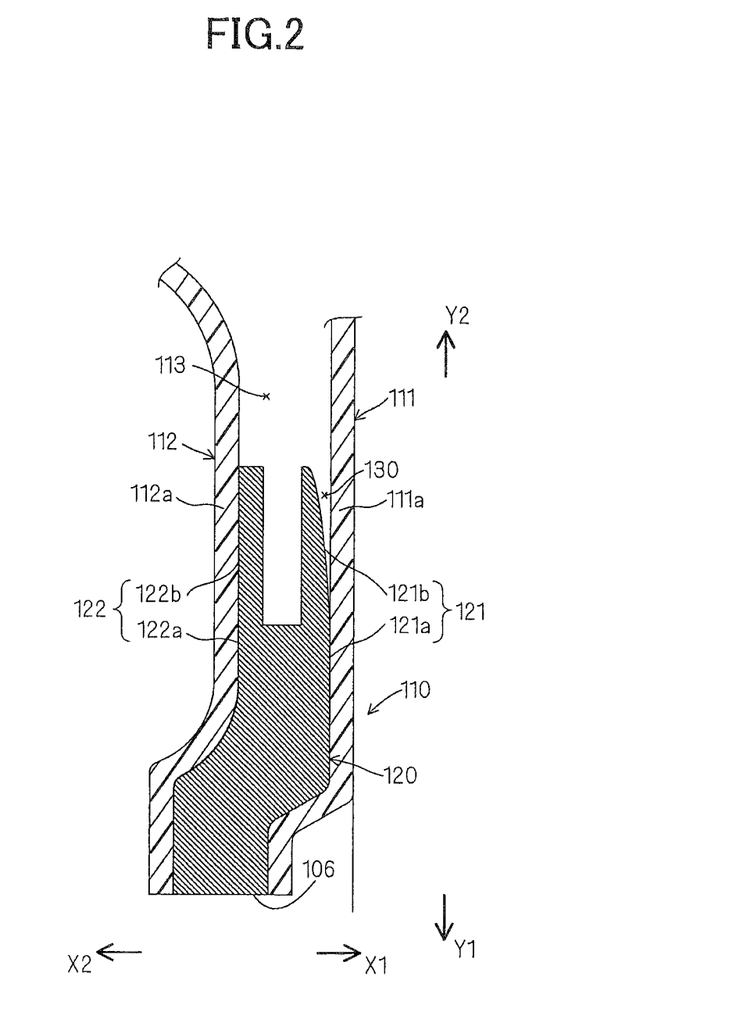
FIG. 2 is a view showing a cross-sectional structure with respect to an A-A line of a bolt-fastening part 110 of the disk wheel 101 shown in FIG. 1.

FIG. 2 is referenced for the cross-sectional structure of the bolt-fastening part 110 of the disk 103. Note that, in FIG. 2 and in the other drawings, an arrow X1 shows a vehicle outer-side (outward) of the wheel W, an arrow X2 shows a vehicle inner-side (inward) of the wheel W. Further, an arrow Y1 shows the radial inner-side (inward) of the wheel W, an arrow Y2 shows the radial outer-side (outward) of the wheel W. Therefore, a first direction along the arrows X1, X2 corresponds to a wheel width direction of the disk wheel 101, and a second direction along the arrows Y1, Y2 corresponds to a wheel radial direction of the disk wheel 101.

The bolt-fastening part 110 has two resin members 111 and 112, each being in the form of layer, (also referred to as an "outer-side resin member 111" and an "inner-side resin member 112"), made of the carbon fiber reinforced plastic (CFRP), with respect to the wheel width direction of the disk wheel 101. These two resin members 111 and 112 are disposed to oppose to each other across a hollow part 113, and the insert member 120 is interposed in the hollow part 113. In this case, a foaming member or the like may be provided in the hollow part 113, or the hollow part 113 may be a hollow space which does not include any inclusion except the insert members 120. The bolt hole 106 of each of the bolt-fastening parts 110 is composed of through-holes, each of which is formed through each of the two resin members 111 and 112, and a through-hole which is formed through the insert member 120 so as to communicate with those through-holes of the resin members 111 and 112 (refer to FIG. 2). In this case, the through-hole of the insert member 120 constitutes a part of the bolt hole into which the fastening bolt 107 is inserted. That is, the bolt holes for the fastening bolt 107 are provided in both of the resin members 111, 112 and the insert member 120. Therefore, each of the fastening bolts 107 provided to the axle hub is inserted into each of the through-holes of the insert members (the divided insert members) when being inserted into each of the bolt holes 106. Consequently, each of the insert members 120 can be fixed to each of the bolt-fastening parts 110 using fastening of each of the fastening bolts 107 and each of the nuts.

In addition, two of the resin members 111 and 112 are respectively bonded to the insert member 120. Specifically, one opposing surface (obverse surface) 121 of the insert member 120 includes a bonding area 121a bonded to the resin member 111, and a non-bonding area 121b. The non-bonding area 121b extends to the radial wheel-outer-side (the direction of the arrow Y2 in FIG. 2) of the disk wheel 101 from the bonding area 121a without being bonded to the resin member 111. That is, the one opposing surface 121 of the insert member 120 is composed of the bonding area 121a and the non-bonding area 121b, wherein an area located at the radial wheel-inner-side is the bonding area 121a bonded to the resin member 111, and an area located at the radial wheel-outer-side is the non-bonding area 121b which is not bonded to the resin member 111. Consequently, an opposing area 111a of the resin member 111 is bonded to the bonding area 121a of the insert member 120 in the area at the radial wheel-inner-side, but is not bonded to the non-bonding area 121b which extends from the bonding area 121a in the area at the radial wheel-outer-side. In particular, the non-bonding area 121b of the insert member 120 is opposed to the opposing area 111a of the resin member 111 across the predetermined gap 130 with respect to the wheel width direction of the disk wheel 101. The predetermined gap 130 is configured as a hollow space in which inclusions are not interposed. Similarly, the other opposing surface (a reverse surface) 122 of the insert member 120 includes a bonding area 122a which is bonded to the resin member 112, and a non-bonding area 122b which is not bonded to the resin member 112. The non-bonding area 122b extends to the radial wheel-outer-side (the direction of the arrow Y2 in FIG. 2) of the disk wheel 101 from the bonding area 122a. That is, the other opposing surface 122 of the insert member 120 is composed of the bonding area 122a and the non-bonding area 122b, wherein an area located at the radial wheel-inner-side is the bonding area 122a bonded to the resin member 112, and an area located at the radial wheel-outer-side is the non-bonding area 121b which is not bonded to the resin member 112. Therefore, the resin member 112 is bonded to the bonding area 122a of the insert member 120 in the area at the radial wheel-inner-side, but is not bonded to the non-bonding area 122b which extends from the bonding area 122a in the area at the radial wheel-outer-side. In particular, the non-bonding area 122b of the insert member 120 is opposed to and in close contact with the opposing area 112a of the resin member 112 with respect to the wheel width direction of the disk wheel 101. The opposing surfaces 121 and 122, the bonding areas 121a and 122a, and the non-bonding areas 121b and 122b correspond to an "opposing surface", a "bonding area" and a "non-bonding area" of the present invention, respectively.

Both of the resin members 111 and 112 have a larger thermal expansion coefficient (particularly, a linear expansion coefficient) compared with the insert member 120, and thus, the difference in the thermal expansion coefficient causes excessive residual stress (thermal stress) in each of the resin members 111 and 112 after the above-described molding process. In view of the above, according to the present embodiment, only the bonding area 121a within the opposing surfaces 121 of the insert member 120 and only the bonding area 122a within the opposing surfaces 122 of the insert member 120 are configured so as to be partially bonded to the respective resin members 111 and 112. That is, a whole of the opposing surfaces 121 and 122 of the insert member 120 is not bonded. Consequently, a size of the bonding area (a bonding length and a bonding area size) between the insert member 120 and the resin members 111, 112 can be reduced, and therefore, the influence of the residual stress caused in the resin members 111, 112 after molding of the disk wheel can be suppressed.

Figure 3:
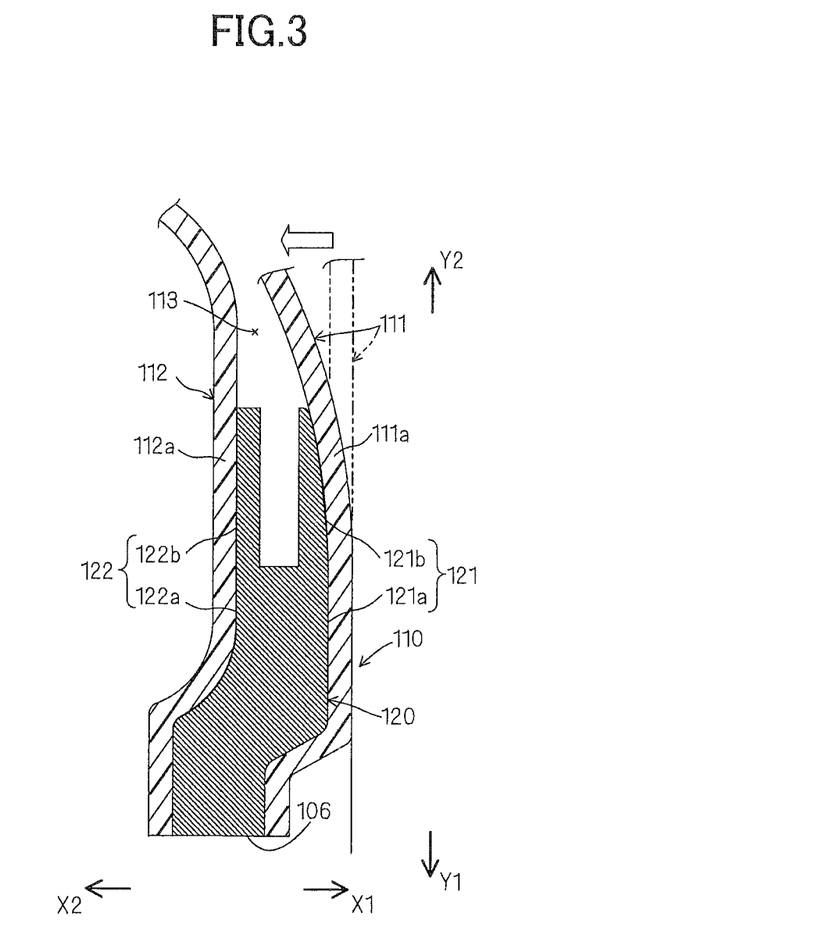
FIG. 3 is a view schematically showing a deformed state of the resin member 111 in the bolt-fastening part 110 of the disk wheel 101 shown in FIG. 2.

On the other hand, when the size of the bonding area between the insert member 120 and the respective resin members 111, 112 decreases, it is difficult to secure the required strength for the bolt-fastening part 110. As shown in FIG. 3, regarding the outer-side resin member 111, the opposing area 111a which is opposed to the non-bonding area 121b of the insert member 120 is apt to bend and deform along a direction of the allow X2 (a direction shown by a white arrow) due to a load along the wheel width direction when the vehicle is running, and therefore, a reduction in strength during the deformation of the opposing area 111a should be concerned. In view of the above, in the present embodiment, the non-bonding area 121b of the insert member 120 serve a function to receive the load caused by the deformation of the opposing area 111a of the outer-side resin member 111 (i.e. the function to support the opposing area 111a). Similarly, the non-bonding area 122b of the insert member 120 serves a function to receive a load caused by the deformation of the opposing area 112a of the inner-side resin member 112 (i.e. the function to support the opposing area 112a). In this case, the reduction in the strength caused due to the decrease of the size of the bonding area between the resin member 111, 112 and the insert member 120 is compensated for by the supporting structure of the opposing areas 111a, 112a of the non-bonding areas 121b, 122b. Consequently, in particular, in the bolt-fastening part 110 which is provided to the hub part 104 within the disk 103, even if the bonding area between the resin members 111, 112 and the insert member 120 is reduced, the required strength of the bolt-fastening part 110 can be secured.

In particular, when the opposing area 111a of the outer-side resin member 111 is deformed by bending a predetermined amount along the direction of the arrow X2, the non-bonding area 121b of the insert member 120 contacts with the opposing area 111a, and thus, achieves the function to receive the load due to the deform of the opposing area 111a. In this case, the insert member 120 can adjust the timing of supporting the resin member 111 in accordance with an amount of the deformation of the resin member 111, and thus, a structure can be realized, the structure permitting the deformation of the resin member 111 and being able to receive the load of the resin member 111 only upon required.

It should be noted that, in a wheel W on which the in-wheel motor is mounted, a specific wheel having a large axle hub, the P.C.D. of the hub part 104 is set at a length larger than a normal length for the normal wheel (e.g., a length selected between 150 and 250 [mm]). For the wheel described above, the size of the bonding area of the resin member 111 and the insert member 120 (particularly, the circumferential length of the bonding area) increases. Accordingly, in this case, as shown in FIG. 1, it is preferable to adopt the structure (the divided insert structure) in which the insert member 120 is individually allocated to the resin member 111 of the bolt-fastening part 110, the bolt-fastening part 110 corresponding to each of the bolt holes 106. This structure can decrease the size of the bonding area between the resin member 111 and the insert member 120 to suppress the influence of the residual stress in the resin member 111 after molding of the disk wheel, as compared with a structure in which one insert member 120 is provided to a resin member having one bolt-fastening part commonly used for a plurality of bolt holes 106. On the other hand, the reduction in strength of the bolt-fastening part 110 caused by adopting the divided insert structure do not have to be concerned, because the reduction in strength is compensated for by the above-mentioned supporting structure of the non-bonding area 121b of the insert member 120. In addition, if the hub part 104 has a large diameter, the wheel width-directional load which the opposing area 111a of the resin member 111 receives when the vehicle is running becomes large. However, the non-bonding area 121b of the insert member 120 can securely receive the load, and thus, it does not have to be concerned.

Figure 4:
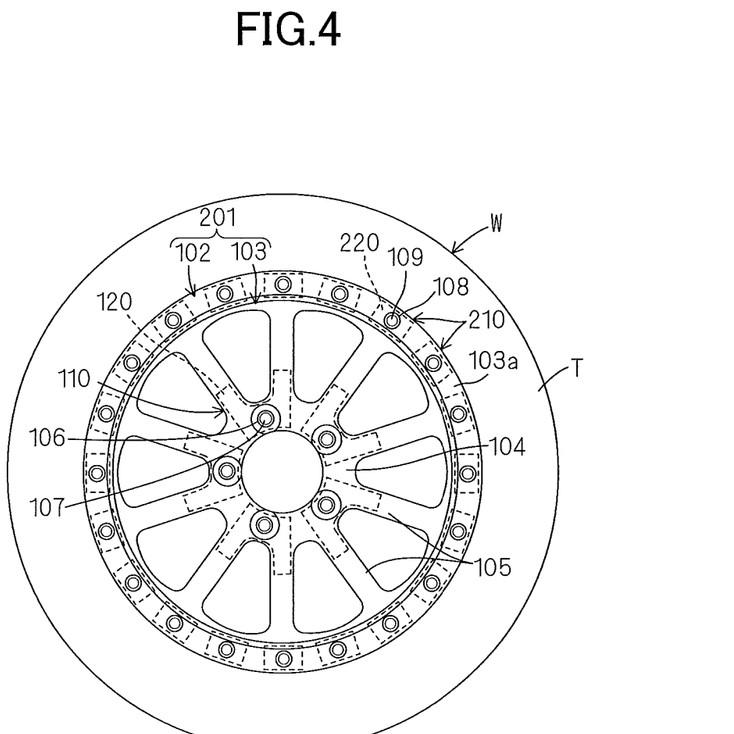
FIG. 4 is a plain view of a disk wheel 201 according to another embodiment.

Next, a case will be described with reference to FIG. 4 in which the above described disk wheel 101 is changed from "one-piece structure" to "two-piece structure" or to "three-piece structure". Note that, the referential marks given to the elements shown in FIG. 1 are given to the corresponding elements shown in FIG. 4 that are substantially the same as the elements shown in FIG. 1. In the disk wheel 201 according to this modification example, the rim 102 and the disk 103 are formed separately, and the fastening bolts 109 (also referred to as "pierce bolts") for fastening the rim 102 and the disk 103 together is inserted through the bolt holes 108 provided in a peripheral part 103a of the disk 103. A plurality of bolt-fastening parts 210 are provided on the peripheral part 103a, the bolt-fastening parts 210 being arranged coaxially and annularly in the circumferential direction of the disk 103 (the circumferential direction of the disk wheel). A metal inserts 220 are embedded in resinous bolt-fastening parts 210, each of which has a bolt hole 108. These bolt hole 108, the bolt-fastening part 210, and the insert member 220 correspond to the "bolt hole", the "bolt-fastening part", and the "insert member" in the present invention, respectively. Although the bolt-fastening part 210 is not particularly illustrated, the bolt-fastening part 210 has the same cross-sectional structure as the cross-sectional structure of the bolt-fastening part 110 shown in FIG. 2. Thus, in particular, with respect to the bolt-fastening part 210 provided in the peripheral part 103a within the disk 103 of the disk wheel 201, the influence of the residual stress in the resin member after molding of the disk wheel can be suppressed, and the required strength can be secured. It should be noted that the disk wheel 201 shown in FIG. 4 is the one in which the present invention is applied to both of the bolt-fastening part 110 and the bolt-fastening part 210, however, the present invention can be applied only to the structure of the bolt-fastening part 210.

The present invention is not limited to the exemplary embodiments described above, but various applications and modifications are possible. For example, each of the following embodiment may be possible in which the above-described embodiments are applied.

In the bolt-fastening part 110 of the embodiment described above, each of the insert members 120 is disposed from an inside of the hub part 104 to an inside of the spoke part 105. However, according to the present invention, a structure may be embodied while comprehensively considering the strength required for the bolt-fastening part 110 and the weight required for the disk wheel 101. For example, if it is desired to increase the strength of the bolt-fastening part 110, a structure can be adopted in which a layout area of each of the insert members 120 inside of the spoke part 105 is increased. On the other hand, if it is desired to reduce the weight of the disk wheel 101, a structure can be adopted in which the layout area of each of the insert members 120 inside of the spoke part 105 is decreased, or in which each of the insert members 120 is not disposed inside of the spoke part 105.

In the bolt-fastening part 110 of the embodiment described above, the gap 130 between the non-bonding area 121b of the insert member 120 and the opposing area 111a of the resin member 111 is the hollow space. According to the present invention, however, a foaming member, or the like, for attenuating an impact at the time of the deformation may be interposed in the gap 130. Alternatively, a structure can be adopted in which the gap 130 is omitted so that the non-bonding area 121b of the insert member 120 and the opposing area 111a of the resin member 111 are in close contact with each other, in advance. In addition, if necessary, a gap similar to the gap 130 can be provided between the non-bonding area 122b of the insert member 120 and the opposing area 112a of the resin member 112.

In the disk wheels 101 and 201 of the embodiment described above, the structure (the divided insert structure) is adopted in which the insert member 120, 220 are individually allocated to the bolt-fastening part 110, 210 corresponding to each of the bolt holes 106, 108. However, according to the present invention, a single insert member may be allocated to a single bolt-fastening part which is common for a plurality of the bolt holes.

In the embodiment described above, the disk wheels 101, 201 are described, which are mainly composed of the carbon fiber reinforced plastic (CFRP). However, the disk wheels may be composed of another resin material. For example, the present invention may be applied to a disk wheel which is mainly composed of a glass fiber reinforced plastic (GFRP) obtained by molding the glass fiber with resin.

The invention claimed is:

1. A disk wheel comprising a metal insert member embedded in a resinous bolt-fastening part having a bolt hole, wherein
the metal insert member includes:
an opposing surface which is opposed to a resin member of the resinous bolt-fastening part;
a bonding area which is bonded to the resin member of the resinous bolt-fastening part within the opposing surface; and
a non-bonding area which extends from the bonding area and is opposed to the resin member of the resinous bolt fastening part across a predetermined gap without being bonded to the resin member of the resinous bolt-fastening part so as to contact the resin member and receive a load caused by deformation of the resin member.

2. The disk wheel according to claim 1, wherein
the disk wheel includes a plurality of the resinous bolt-fastening parts having a corresponding plurality of the bolt holes, and a plurality of the metal insert members,
the bolt holes are annularly arranged in a circumferential direction of the disk wheel, and each of the metal insert members is individually allocated to a corresponding one of the bolt-fastening parts.

3. The disk wheel according to claim 2, further comprising a cylindrical rim, a discoidal disk jointed to the cylindrical rim, and a hub part which has the bolt holes and is mountable to an axle hub, and wherein fastening bolts of the axle hub are insertable through each of the bolt holes.

4. The disk wheel according to claim 3, wherein
the discoidal disk comprises a plurality of spoke parts extending radially from the hub part; and
the metal insert members allocated to the respective bolt holes are arranged from a hollow part of the hub part to a hollow part of the respective spoke parts, and comprise through holes which are formed in an area of the metal insert members arranged in the hollow part of the hub part so as to form a part of the bolt holes.

5. The disk wheel according to claim 1, further comprising
a cylindrical rim, a discoidal disk which is formed separately from the cylindrical rim, a peripheral part of the discoidal disk having a plurality of rim bolt holes, and a plurality of rim fastening bolts for fastening the cylindrical rim and the discoidal disk to each other are inserted through the rim bolt holes.

6. The disk wheel according to claim 2, further comprising
a cylindrical rim, a discoidal disk which is formed separately from the cylindrical rim, a peripheral part of the discoidal disk having a plurality of rim bolt holes, and a plurality of rim fastening bolts for fastening the cylindrical rim and the discoidal disk to each other are inserted through the rim bolt holes.

* * * * *